May 24, 1932.  M. J. HUGGINS  1,859,332
ELECTRIC INDICATING MEANS
Filed June 30, 1924    2 Sheets-Sheet 1
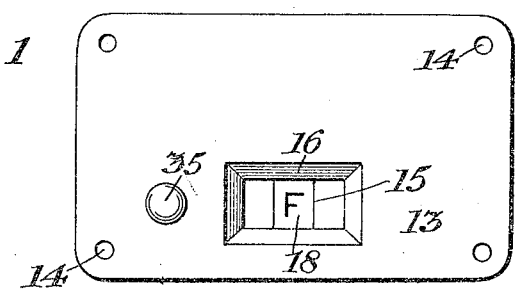
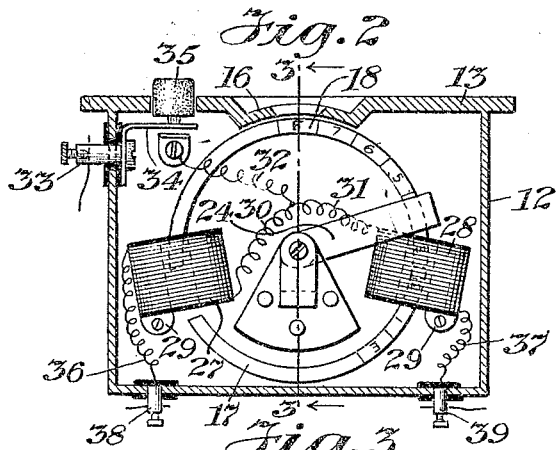
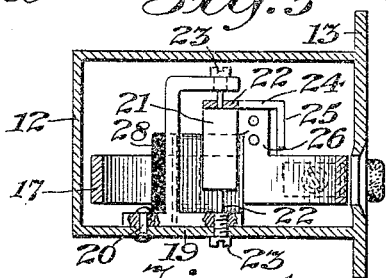
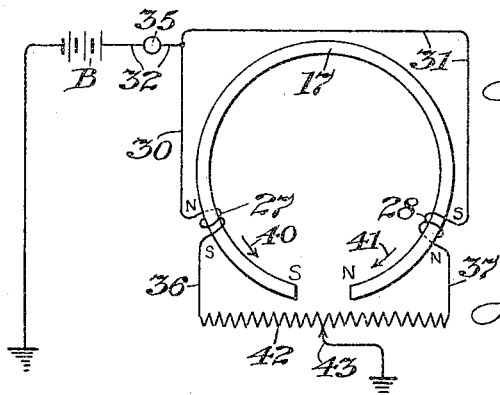
INVENTOR
Merion J. Huggins
BY
HIS ATTORNEY May 24, 1932.  M. J. HUGGINS  1,859,332
ELECTRIC INDICATING MEANS
Filed June 30, 1924   2 Sheets-Sheet 2
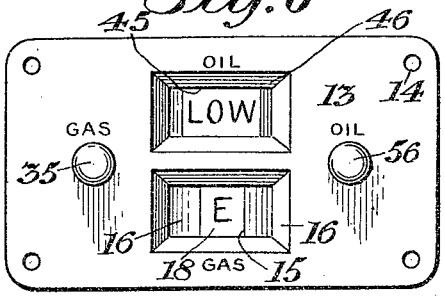
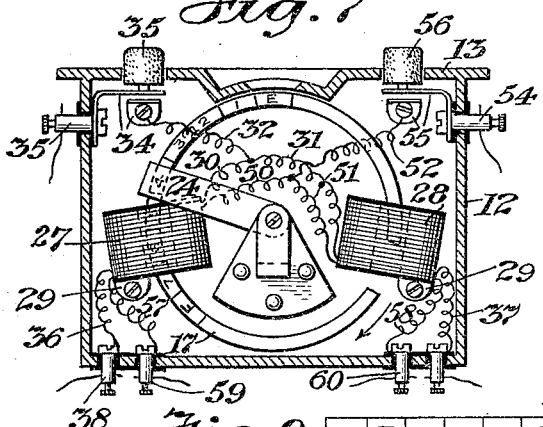
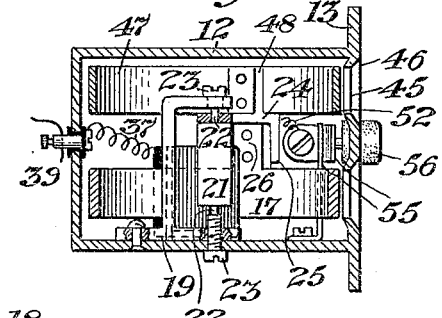
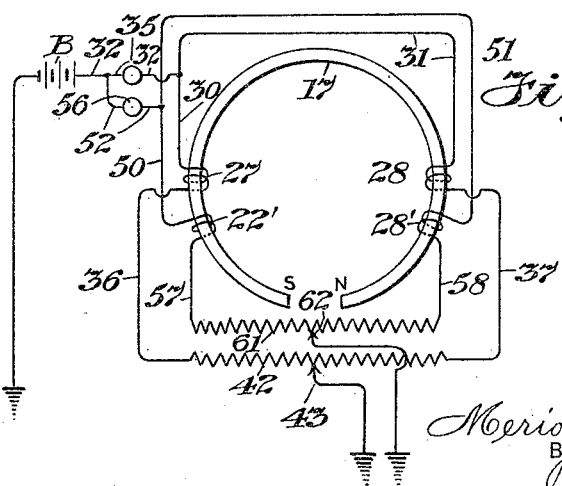
INVENTOR
Merion J. Huggins
BY
John O. Seifert
HIS ATTORNEY Patented May 24, 1932

1,859,332

UNITED STATES PATENT OFFICE

MERION J. HUGGINS, OF UPPER SADDLE RIVER, NEW JERSEY, ASSIGNOR TO AUTO-METER COMPANY, INC., OF NEW YORK, N. Y., A CORPORATION OF DELAWARE

ELECTRIC INDICATING MEANS

Application filed June 30, 1924. Serial No. 723,241.

This invention relates to electric indicating means for ascertaining the quantity of liquid in one or more tanks, and particularly adapted for use in connection with motor vehicles to ascertain the quantity of gasolene in the usual gasolene storage tank carried by the vehicle, or the quantity of gasolene in said tank and quantity of oil in the crank case of the engine constituting the motive power for the vehicle, and it is the object of the invention to provide an improved means for this purpose which is simple in structure and efficient in use.

In carrying out the invention there is provided indicating means including an armature element and means adapted to be electrically connected to a source of electric energy to generate opposed magnetic forces, said armature element having an indicator associated therewith and arranged so that one is movable relative to the other through the generated magnetic forces acting upon the armature element and thereby actuate the indicating means, and said magnetic force generating means being adapted to have means connected in circuit therewith to vary the magnetic value of one of said forces relative to another of said forces, the actuation of the indicating means being effected and controlled by said variations induced in the magnetic value of one of said forces relative to the magnetic value of another of said forces, and said indicating means and its magnetic actuating means being mounted in a casing to serve as a support therefor and the indicating means to be observed through an opening or openings in the casing.

A further object of the invention relates to an improved constructed and arranged electric indicating device or instrument which is of compact unitary structure and adapted to indicate the condition at will of one or more apparatus, or the quantity of liquid in one or more tanks.

Other objects and advantages will hereinafter appear.

In the drawings accompanying and forming a part of this specification, Figure 1 is a front elevation of a casing in which an embodiment of the improved electric indicating means is mounted and whereby it is adapted to be supported as from the instrument board of a motor vehicle.

Figure 2 is a sectional side elevation of the indicating device to show the arrangement and the mounting of one embodiment of the indicating means in its casing.

Figure 3 is a cross sectional view taken substantially centrally through Figure 2.

Figure 4 is a plan view of a dial or scale for use in connection with the indicating means shown in Figures 1 and 3.

Figure 5 is a diagrammatic view to show the electrical connections between the different elements of the device shown in Figures 1 to 4, and an external resistance device connected in circuit therewith to control the energization of the coils and the generation of the magnetic indicator actuating fields.

Figure 6 is a front elevation of a casing in which a modified arrangement of the indicating means shown in Figures 2 to 4 is mounted.

Figure 7 is a longitudinal sectional view taken substantially centrally through Figure 6 to show the arrangement and the mounting of the mechanism within the casing.

Figure 8 is a cross sectional view taken substantially centrally through Figure 7.

Figures 9 and 10 are plan views of dials or scales for use in connection with the device shown in Figures 6 to 8.

Figure 11 is a diagrammatic view to show the electrical connections between the different elements of the device shown in Figures 6 to 8 with external resistance devices connected in circuit therewith for use with and forming a part of the invention to control the energization of the coils and the generation of the magnetic indicator actuating fields.

In the embodiment of the invention shown in Figures 1 to 5 of the drawings the operative mechanism is mounted in a casing including a cup shaped portion 12 which may consist of a sheet metal stamping and having a face or cover plate 13 which is preferably releasably connected to the portion 12 with portions of said plate extending laterally from the portion 12 whereby the device is mounted upon a support, such as the instrument board of a motor vehicle, by attachment means, such as screws, passing through perforations 14. The cover plate 13 is arranged with a perforation 15 which is in the nature of a window arranged in a depressed portion 16 to extend into the casing with the bottom wall of curved form in cross section and longitudinally of the casing, as shown in Figure 2 for a purpose to be hereinafter described.

In the embodiment illustrated in said figures the indicator comprises an armature member 17 in the form of a split ring of magnetizable material, or of a material adapted to be polarized, such as steel. This ring is of greater width than thickness and subtends through an arc of less than 360 degrees and has a scale or dial arranged on the periphery, which scale is graduated or calibrated, in the present instance to indicate quantity by measure, as in gallons, but if desired it may be arranged to indicate the level of the liquid in a tank. This calibration may be arranged on the indicator in any suitable manner, in the present instance it being arranged on a strip 18 of paper, celluloid or other suitable material, as by printing, (Figure 4) and said strip attached to the periphery of the ring as by an adhesive. The indicator ring is pivotally supported in the casing to have limited movement about its axis and is arranged so that the periphery thereof will lie contiguous to and below the bottom curved wall of the depression 16 in the cover plate in alinement with the window 15 so that it may be observed through said window, as shown in Figures 1 and 2. The invention has been particularly designed for measuring and indicating the quantity of liquid in a tank, such as the gasolene in the gasolene tank of a motor vehicle, for which purpose the scale has been calibrated to indicate the quantity by measure, such as gallons, and is arranged with the indice "E" at one end of the scale, and when the indicator is in position to expose said symbol through the window it will indicate that the tank is empty. The opposite extremity of the scale is arranged with the indice "F" and when the indicator is in position to expose said symbol through the window 15 it will indicate that the tank is full. The present scale is arranged for a tank having a capacity of eight gallons for which purpose the scale is arranged with the numeral characters 1 to 7 inclusive and should the indicator be positioned to expose either one of said characters through the window it will indicate that the tank contains the number of gallons corresponding to the numeral exposed through the window. When the indice "F" is exposed it will indicate that the tank contains eight gallons and is filled to capacity. For illustrative purposes and convenience of understanding, the indices of the scale 18 are shown on the end of the indicator in Figure 2, and which also indicates the positioning of the scale upon the indicator.

The armature ring is mounted in the casing by yoke shaped bracket 19 of non-magnetizable material secured to the side wall of the casing by riveting or the like, as shown at 20. A bearing member 21 also of non-magnetizable material is pivotally supported between the legs of the yoke portion of the bracket by hardened pivot pins 22 carried by studs 23, one of which studs is threaded into one leg of the yoke portion of the bracket, and the other stud threaded into the other yoke leg and into the adjacent casing wall. The bearing member 21 has a radially extending arm 24 the extremity 25 of which is bent at a right angle thereto and in parallel relation to the bearing member and by which bent arm portion the armature is carried by riveting to a projection 26 extending laterally from and integral with the armature. The armature is actuated by the influence of the magnetic force of magnetic fields each of which forces is adapted to be varied relative to the other of said forces. For this purpose there is provided a pair of electric current coils 27, 28 wound upon spools S carried by bracket 29 fixed to the wall of the casing with the centers of the coils arranged at equal distances from the center of rotation of the armature and with the space between the lower ends of the coils less than 180 degrees apart, said coils being in the nature of solenoids arranged in spaced and angular relation to each other and centrally between which coils the pivot support of the armature is located whereby the armature is adapted to have movement in the plane of and within the centers of the lines of force and the cores of the coil spools and be within the zone and under the influence of both coils in all indicating positions thereof, thereby preventing critical response of said armature to the individual energization of either coil and adapted to be actuated jointly by the coils to a multiplicity of indicating positions. One terminal 30, 31 of each coil is electrically connected by a conductor 32 with a contact terminal or binding post 33 carried by and insulated from the casing and arranged for connection to a source of electricity, such as a battery, indicated at B in Figure 5. The connecting conductor of the coils with the contact terminal 33 has a switch 34 interposed therein, shown as of the normally open type, and adapted to be operated to close the circuit of the coils by a push button 35 connected to the movable member of the switch and slidably engaging in an opening in the cover plate for the casing to be operated from the exterior of the casing. The other terminals 36, 37 of the coils are connected to contact terminals or binding posts 38, 39 carried by and insulated from the casing and whereby the coils are adapted to have connected in circuit therewith variable electric current resistance means to vary the current flow through said coils and thereby differentially energize the coils and vary the magnetic force or field generated by one coil relative to the other. The coils in the present instance are arranged so that as a resistance is set up to the current flow through one coil, for instance the coil 27, there will be an increase in the current flow through the other coil 28 which increase will be proportional to the decrease of the current flow through the coil 27.

It will be noted that the electrical connection of the coils through the conductor 32 with the source of electricity is such that the flow of the current through the coils is in opposite directions and whereby the magnetic fields or forces generated by said coils will exert forces upon the indicator ring in opposite directions. Assuming the north pole of the indicator ring is at N while the south pole is at S as indicated in Figure 5. By winding of the coil 27 as indicated the direction of the current flow through the coil will be from the north to the south pole as indicated by N and S associated with said coil in Figure 5 and thereby generate a directive magnetic force to move the indicator ring in a direction indicated by the arrow 40, and by the winding of the coil 28 as indicated the direction of the current flow through the coil will be from the south to the north pole as indicated by S and N associated with said coil and thereby generate a directive magnetic force to move the indicator ring in the direction indicated by the arrow 41.

The present means is adapted for measuring and indicating the quantity of liquid in a tank and for which purpose means are provided to set up a variably increased and decreased resistance to the current flow through the coils and thereby increase and decrease the value of the magnetic force generated by one coil relative to the other. In the present instance the increase of the current flow through one coil and a consequent increase in the value of the force of the magnetic field generated by the coil will be proportional to a decrease in the current flow through the other coil and a corresponding decrease in the value of the force of the magnetic field generated thereby. This means comprises a variable resistance or rheostat device arranged in the tank containing the liquid to be measured and different portions of said resistance device are cut into and out of the circuit of the coils by means operative by the quantity of liquid or the liquid level in the tank. This external resistance device is illustrated in a diagrammatic manner at 42 in Figure 5 having one terminal connected with the coil 27 through the conductor 36 and binding post 38, and the other terminal of the resistance device being connected with the coil 28 through the conductor 37 and binding post 39. Proportional amounts of the resistance device 42 are connected into or cut out of the respective coils to vary the magnetic field generated by one coil relative to the other by a contact member represented by the arrow 43 in Figure 5 movable relative to the resistance device, said contact member being connected with the source of electricity, but in motor vehicle practice being grounded in the vehicle frame. This contact member 43 comprises a magnet carried by a float to rise and fall with the liquid level in the tank the quantity of liquid in which tank is to be ascertained.

In operation, assuming the tank to be full, the contact maker or slider 43 will be at one terminus of the resistance device, the right hand end when viewed from Figure 5, and in practice when mounted in a tank at the upper end whereby when the circuit with the source of electricity is closed through the switch 34 by the push button 35 cutting out all of the resistance device from the circuit of coil 28 and connecting all of the resistance device into the circuit of coil 27, whereby the value of the magnetic field generated by said coil 28 will influence and exert a directive force upon and move the armature element 17 in the direction indicated by the arrow 41 in Figure 5 overcoming the directive force generated by the coil 27 and move said element to position the same with the indice "F" exposed through the window 15. This is one of the extreme positions to which the element 17 is moved and it will be noted from Figure 2 that said element is of a length so that it will extend substantially into the fields generated by the coils and to substantially the center of the magnetic forces generated by both coils in all indicating positions thereof. As the liquid level in the tank falls the contact maker 43 will be moved downward relative to the resistance device, or in a direction from the right to the left as indicated in Figure 5, and assuming that the tank has been emptied to one-half its capacity said contact maker will be positioned substantially midway between the terminii of the resistance device. In such position upon the closing of the circuit substantially one-half of the resistance device will be connected in circuit with each of the coils 27, 28 and each coil will generate a magnetic force the value of which is substantially equal, thereby causing the element 17 to be moved in the direction of the arrow 40 until it assumes the position shown in Figure 5 and expose the scale character "4" through the window 14 indicating that the tank contains four gallons or is half full. It will be obvious that as the liquid is continued to be withdrawn from the tank that the contact maker 43 will travel in a direction to cut out more of the resistance device from the coil 27 and connect more of said device into the coil 28 increasing the value of the force of the magnetic field generated by the coil 27 and decreasing the value of the force of the magnetic field of the coil 28 proportionately, and that the reverse will be the case when liquid is supplied to the tank and the liquid level rises.

It will thus be seen that the coils when connected in circuit with the source of electric energy are adapted to be differentially energized therefrom to generate fields of variable value one relative to the other and within which fields the member 17 is located to follow the magnetic centers of the fields and thus be moved to different positions, and that said element is of a length to come within and be influenced by said fields in all positions thereof.

To measure and indicate the quantity of liquid in a plurality of tanks, the indicating means is arranged to be positioned by two or more resistance devices arranged to have different amounts connected into and cut out of an electric circuit with a pair of coils to regulate the magnetic fields generated by said coils to influence and actuate an element of magnetizable material or a material adapted to be polarized with which the indicator is associated to be moved or actuated thereby. In Figures 6 to 11 inclusive there is illustrated such an arrangement combined with the device illustrated in Figures 1 to 5 constructed and arranged as hereinbefore described and adapted for use as a duplex indicating device for measuring and indicating the quantity of liquid in a pair of tanks. In adapting the device for this purpose the closure plate 13 for the casing is arranged with a further opening or window 45 in juxtaposed relation to the window 15, said window 45 being arranged in a depressed portion 46 of the closure plate similar to the window 15. A supplemental or auxiliary dial or indicator is provided, in the present instance shown as an annulus or ring 47 connected to a projection 48 extending laterally from the arm 24 of the bearing member opposite to the projection 25 to which the ring 17 is connected, and secured to the annulus by riveting. By this arrangement it will be obvious that the annulus 47 is arranged in axial relation to and is moved by or participates and moves in unison with the ring 17. The annulus is located with the peripheral surface in contiguous relation to and below the window 45 (Figure 8), and has a scale or graduation arranged on the periphery thereof similar to the ring to be observed through the window 45. In the present instance the auxiliary indicator 47 is adapted to indicate the quantity of oil in the crank case of the engine of a motor vehicle, and for which purpose it has arranged on the periphery the indices "Half", "Full" and "Low". These indices are preferably arranged on a strip 49 of paper, celluloid or the like as by printing (Figure 10) and the strip attached to the annulus as by an adhesive.

The supplemental indicator is actuated through the influence of the armature ring 17. In this arrangement the armature ring also serves as an indicator influenced by the coils 27, 28 when the circuit of said coils is closed through the switch 34 by the push button 35. To influence said ring to indicate the quantity of oil in the crank case by the indicator 47 a second pair of magnetic force generating coils are provided. These coils are wound upon the spools S with the coils 27, 28, indicated diagrammatically at 27' and 28' in Figure 11 and adapted to effect a polarization of the armature ring. The coil 27' on the spool with coil 27 is arranged to generate a magnetic field to exert a force upon the armature ring to move it in the direction of its south pole the same as the coil 27, while the coil 28' on the spool with coil 28 is arranged to generate a magnetic field to exert a force upon the armature ring to move it in the direction of its north pole the same as the coil 28, said direction of current flow being indicated by the characters N and S in Figure 11. One terminal 50, 51 of each of said coils is connected by a conductor 52 through a binding post 54 carried by and insulated from the casing with the battery B, the conductor 52 having a normally open switch interposed therein, as shown at 55, adapted to be closed from the exterior of the case by a push button 56 mounted in and extending through a perforation in the cover plate 13. The other terminals 57, 58 of the coils are connected to binding posts 59, 60 carried by and insulated from the casing and whereby the coils are connected in circuit with a resistance device, arranged to have different amounts thereof connected to either one of the coils 27', 28' and proportionally cutting out the resistance device from the other coil to thereby differentially energize the coils and vary the value of the magnetic force generated by the one coil relative to the other. This resistance device is illustrated in a diagrammatic manner at 61 in Figure 11 having the opposite terminals 57, 58 connected to the coils 27', 28' respectively, and with which a contact maker illustrated by the arrow 62 co-operates.

In operation, assuming the oil level to be low in the crank case of the engine the contact maker 62 will be at the right hand end of the resistance device 61 cutting practically all of the resistance device out of the coil 28' and connecting the resistance device in circuit with the coil 27'. As practically all of the resistance device connected is in circuit with the coil 27' a magnetic field will be generated by said coil which will generate and exert a directive force upon the armature element to move it in the direction of its south pole against the directive force generated by the coil 28' thereon and position said element and thereby the indicator 47 with the indication "Low" exposed through the window 45, the armature element being moved to its extreme position opposite to that illustrated in Figure 2 but not out of the zone and influence of the coils. Should the crank case be filled to one-half its capacity the contact maker 62 will be moved to position substantially midway between the terminii of the resistance device as indicated in Figure 11 when the armature element through the magnetic directive force of the coil 27' and 28' will be moved to the position indicated in Figure 11 and with the indicator or dial 47 in position to expose the indication "Half" through the window 45.

It is to be understood that the invention is not limited in scope to the exact detail of construction and arrangement of parts, and that various modifications may be resorted to and portions of the invention may be used without others without departing from the scope of the invention.

Having thus described my invention I claim:

1. In an electric indicating device, a movably supported indicator including a polarized split ring and supported to have movement about its axis, and a pair of coils to generate a pair of magnetic fields in which the portions of the ring at opposite sides of the center are adapted to engage and moved under the influence of said fields, said coils being arranged whereby the magnetic field generated by one coil will exert a force upon the ring to move it in the direction of one pole and the magnetic field generated by the other coil will exert a force upon the ring to move the ring in the direction of its other pole.

2. In an electric indicating device, an armature member of arcuate form supported to have oscillatory movement about its axis and a pair of fixed magnetic field generating coils arranged in spaced relation to each other with the cores in the plane of movement of said armature member and said member adapted to move within the cores of the coils and the flux fields thereof to be under the influence of said fields in all positions of said member, and indicator means movable with said member.

3. In electric indicating means, a source of electricity, means in circuit therewith to be differentially energized therefrom to generate two magnetic fields the value of the force of one of which fields is adapted to be decreased proportionally with an increase in the value of the magnetic force of the other field, an armature of arcuate form supported to have rotative movement about its axis in a plane with the centers of the lines of force of said fields and being of a length to extend into the magnetic zones of said fields in all positions thereof to be moved under the influence of said fields, one of said magnetic fields exerting a force on the armature to move it in one direction and the other field exerting a force on the armature to move it in the opposite direction and moved toward the flux field having the greatest strength, and an indicator movable with said armature.

4. In an electric indicating device, an arcuate member of magnetizable material supported to rotate about its axis and arranged with calibrations circumferentially disposed about the same to adapt said member as an indicator, a pair of coils to generate magnetic fields and in the lines of force of which fields the arcuate member is movable, said coils being arranged whereby the magnetic fields generated thereby will influence the arcuate member, one to exert a force on said member to move it in one direction and the other to exert a force thereon to move it in the opposite direction, and a casing in which the arcuate member and coils are mounted having an opening relative to which the graduations on the arcuate member are adapted to be positioned and exposed therethrough by the movement of said member.

5. In an electric indicating device, an arcuate armature supported to rotate about its axis, a pair of magnetic field generating coils, said coils adapted to be differentially energized being spaced equal distances from the axis of the armature and from each other in the direction of movement of the armature and arranged with the cores in line with the path of movement of the armature for movement of the latter therein in opposite directions under the influence of the forces of the fields generated by said coils, and an indicator associated with the armature.

6. In an electric indicating device, means for generating a pair of magnetic fields, a member of arcuate form of magnetizable material, means to support said member to have oscillatory movement about its axis in the plane and centers of the lines of force of said magnetic fields in all positions thereof and to be moved under the influence of said fields, one of said fields being adapted to exert a force on and urge said member in one direction, and the other field adapted to exert a force on and urge said member in the opposite direction, and indicator means circumferentially disposed about and movable with the armature to different indicating positions.

7. In electric indicating means, an arcuate member of magnetizable material supported to have rotative movement about its axis, a pair of magnetic force generating coils in the magnetic fields of which coils said member is located to be rotated to variable positions under the influence of said fields, and a second arcuate member carried by the first arcuate member in axial relation thereto and participating in the movement thereof, and indicating means associated with each arcuate member to be moved to variable indicating positions by the movement of said members.

8. In an electric indicating instrument, a pair of solenoids arranged in spaced and angular relation to each other, an armature of arcuate form, means to pivotally support said armature centrally between the coils and to have oscillatory movement about its axis and in the plane of the lines of force of the magnetic fields generated by said coils to be moved under the influence of the magnetic fields generated by the coils, said member extending through an arc and adapted to have movement of such extent so that it is located within the zones of the magnetic fields generated by said coils in all positions thereof.

9. An electric indicating instrument as claimed in claim 8, wherein the arcuate member and coils are mounted in a casing, and the arcuate member is arranged with quantity indications about the periphery adapted to be exposed through an opening in the casing.

10. In an electrical indicating instrument, a pair of solenoids, and an armature movable within the solenoids and extending at least to the magnetic center of each solenoid for each extreme operative position and adapted to be actuated jointly by the solenoids to a multiplicity of stable indicating positions.

11. In an electric indicating instrument, a rotatably supported armature of magnetic material extending through an arc less than 360°, a pair of spaced solenoids having their magnetic centers located at substantially equal distances from the center of rotation of the armature, the said armature being movable within the solenoids and being of sufficient length to extend into the zones of influence of both solenoids in every operative position, and indicating means carried by the armature.

12. In an electric indicating instrument, a pair of spaced solenoids adapted to be differentially energized to different relative degrees, and a pivotally mounted armature of magnetic material adapted to remain at all times within the zone of influence of both of said solenoids thereby preventing critical response of said armature to the individual energization of either solenoid, said armature being adapted to be moved to a multiplicity of different indicating positions by the relative energization of said solenoids.

13. An indicating system comprising a source of electrical energy, a plurality of windings adapted to be differentially energized therefrom to varying degrees, an armature of magnetic material mounted to move within said field and adapted to follow the magnetic lines of force of the fields through a multiplicity of indicating positions, and indicating means actuated by the armature, said armature being of sufficient length to extend with the zone of greatest magnetic influence of each of said windings at all times.

14. In an electric indicating device, a casing having an opening, an indicator comprising a polarized member of arcuate form pivotally supported in the casing to have movement about its axis and arranged in juxtaposed relation to the casing opening, said indicator being arranged with indices for observation through the casing opening, and a pair of magnetic field generating coils in the casing in and under the influence of which magnetic fields the indicator is moved, the field of one of said coils exerting a force on and moving the indicator in one direction and the field of the other coil exerting a force on and moving the indicator in the opposite direction.

15. In an electric indicating device, a casing having an opening, an armature of arcuate form rotatably supported in the casing to have movement about its axis and arranged with a portion juxtaposed to the casing opening to be exposed therethrough and having calibrations circumferentially disposed about the same for observation through the casing opening, a pair of magnetic field generating coils in the casing in the cores of which coils the armature is adapted to move under the influence of the magnetic fields generated by the coils, the magnetic field generated by one coil exerting a force on and moving the armature in one direction and the magnetic field generated by the other coil exerting a force on and moving the armature in the opposite direction, a contact terminal carried by the casing to which one terminal of each coil is connected, a normally open switch interposed in the connection of the coils with said terminal operative from the exterior of the casing to close the circuit of the coils through said terminal, and a pair of contact terminals carried by the casing to which the other terminals of the coils are electrically connected.

16. In electric indicating means, a casing arranged with windows, a plurality of arcuate members having calibrations circumferentially disposed about the same mounted in the casing to rotate in unison and expose a circumferentially calibrated portion through the casing windows, one of which members comprises an armature, two pairs of windings for generating two pairs of differentially energized magnetic forces and in the zones of influence of which forces the armature is located in all positions thereof and adapted to be moved under the influence of each pair of forces, contact terminals carried by the casing with which the windings are connected in open circuit and adapted for connection with a source of electricity with an external variable resistance device in the circuit of each pair of windings, and selective means for closing the circuit of either of the windings and connect a resistance device in circuit therewith.

Signed at New York city, in the county of New York and State of New York, this 12th day of June, 1924.

MERION J. HUGGINS.